United States Patent [19]
Matsumura

[11] 3,904,287
[45] Sept. 9, 1975

[54] REVERSIBLE PROJECTOR SLIDE CHANGE OF THE SLIDE STACK TYPE

[75] Inventor: Yoshiro Matsumura, Tokyo, Japan

[73] Assignee: Asahi Kogaku Kogyo Kabushiki Kaisha, Tokyo, Japan

[22] Filed: Oct. 9, 1973

[21] Appl. No.: 404,469

[30] Foreign Application Priority Data
Oct. 18, 1972 Japan............................ 47-119616

[52] U.S. Cl............................. 353/114; 353/DIG. 1
[51] Int. Cl.² ......................................... G03B 23/14
[58] Field of Search ............ 353/116, 118, 103, 92, 353/106, 114, 117, 107, DIG. 1; 40/36, 79

[56] References Cited
UNITED STATES PATENTS

| | | | |
|---|---|---|---|
| 3,170,370 | 2/1965 | Mulch.................................. | 40/79 |
| 3,258,867 | 7/1966 | Hall...................................... | 40/79 |
| 3,427,739 | 2/1969 | Robinson............................. | 40/79 |
| 3,453,044 | 7/1969 | Schlessel.......................... | 353/11 C |

FOREIGN PATENTS OR APPLICATIONS

| | | | |
|---|---|---|---|
| 2,127,619 | 12/1971 | Germany.......................... | 353/114 |

*Primary Examiner*—Richard E. Aegerter
*Assistant Examiner*—John W. Shepperd
*Attorney, Agent, or Firm*—Wolder & Gross

[57] ABSTRACT

An automatic slide projector having a transversely reciprocatable slide changing member, including a slide extracting element and a slide return element is provided along its side with a longitudinally extending stack holding tray, having a forwardly and rearwardly shiftable base panel. A space member is mounted on the base panel and divides the slides into front and rear stacks and a guide finger is horizontally swingably mounted on the outer border of the base panel in alignment with the slide changer member and is spring biased so as to alternatively engage the front and rear stack inner slides when the base panel is in its rear and forward shift positions. The inner slides of the front and rear stacks are alternatively in the path of the slide extractor element when the base panel is in its rear and front shift positions. The base panel is spring biased to one position and is solenoid actuated to its other position.

3 Claims, 5 Drawing Figures

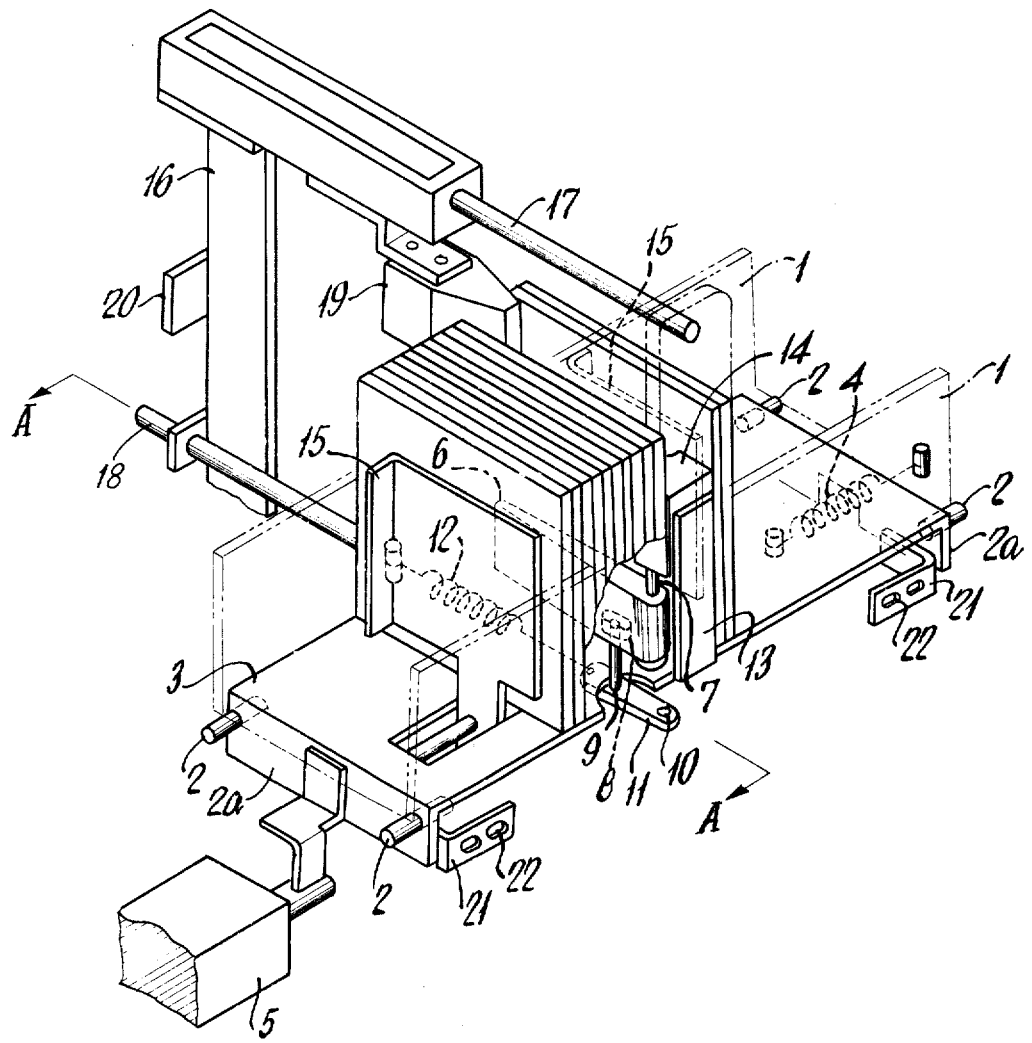

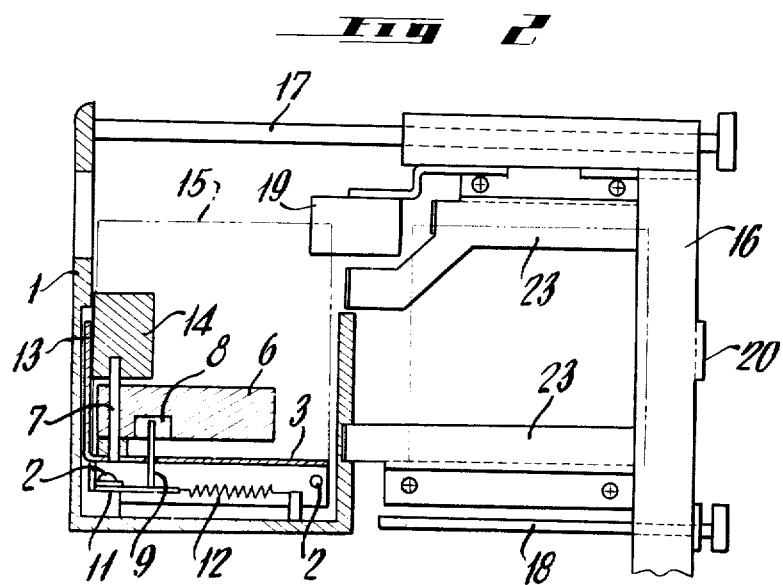
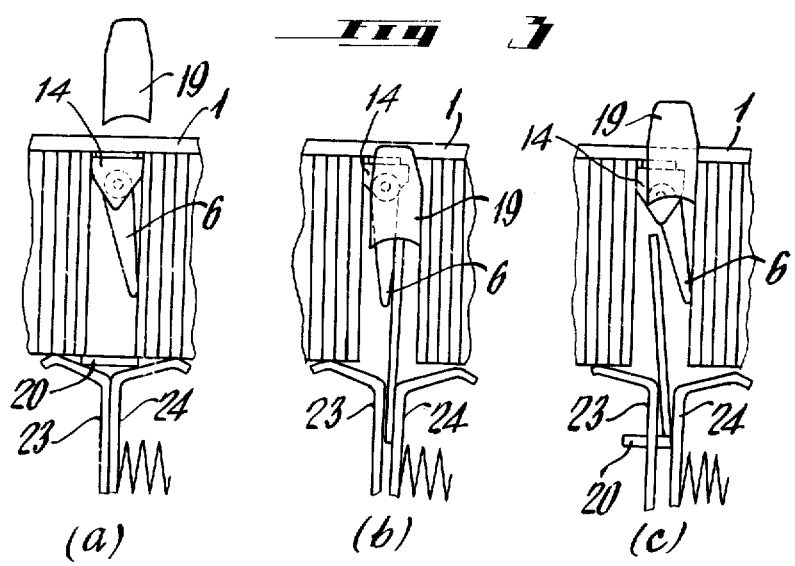

REVERSIBLE PROJECTOR SLIDE CHANGE OF THE SLIDE STACK TYPE

BACKGROUND OF THE INVENTION

The present invention relates generally to improvements in slide projectors and it relates more particularly to an improved projector slide changing mechanism of the type in which the slides are loaded as a stack and the projected slides are returned to a second stack.

In a well known type of automatic slide projector the slides are stacked in closely packed relationship and a slide changing mechanism is provided for extracting successive slides from the stack and advancing them to the projector slide projecting station following the ejection of the previous slide. This type of slide changing mechanism heretofore available and proposed possesses numerous drawbacks and disadvantages. These mechanisms are generally unreliable, expensive and complex, and require for their proper operation great accuracy and close tolerances which are not normally available in mass production. Great precision in their production and operation is necessary, since the slides are not only very thin, but vary in thickness, depending on their source and manufacturer, and they frequently change dimensions and warp the age, and the absence of such precision results in malfunctioning of numerous forms and frequent inoperativeness. Furthermore, since the slide changing cycle is repeated, a great number of times, the mechanism must be rugged and durable, characteristics which are often lacking in the conventional mechanism.

SUMMARY OF THE INVENTION

It is a principal object of the present invention to provide an improved slide projector.

Another object of the present invention is to provide an improved projector slide changing mechanism.

Still another object of the present invention is to provide an improved projector slide changing mechanism wherein the slides to be projected are supported in stacks and are withdrawn from one stack for projection and the projected slide returned to another stack.

A further object of the present invention is to provide an improved two stack slide changing mechanism wherein the slide to be projected is selectively withdrawn from either stack.

Still a further object of the present invention is to provide a projector mechanism of the above nature characterized by its reliability, ruggedness, simplicity, low cost, durability, ease and versatility of operation and great adaptability.

The above and other objects of the present invention will become apparent from a reading of the following description taken in conjunction with the accompanying drawing, which illustrates a preferred embodiment thereof.

In a sense, the present invention contemplates the provision of a projector slide changing mechanism comprising a slide stack support tray, a spacer member mounted on the tray and longitudinally shiftable between front and rear positions and dividing the slides carried by the tray into front and rear stacks having confronting longitudinally spaced inner slides, and a transversely reciprocatable slide changer member including a slide extractor element transversely movable between the confronting inner slides along a path alternatively registering with the inner slides of the front and rear stacks when the spacer member is in its rear and forward positions respectively. Advantageously, the bottom wall or panel of the tray supports the slide stacks and the spacer member is mounted thereon and longitudinally shiftable therewith. A slide return guide is positioned between the slide stacks and alternatively engages the inner slide of the front or rear stack with the rear and forward shifting of the spacer member respectively, and guides the returning slide to the opposite stack.

In the preferred form of the improved mechanism, the slide return guide is in the form of a finger pivoted to the tray base panel at its outer border and below the spacer member and a spring biases the outer end of the finger in a fixed direction, so as to engage opposite confronting slides with the shifting of the tray base panel and finger pivot. Spring loaded longitudinally slidable stack pushers are located on opposite sides of the spacer member. A spring biases the base plate to its rear position and a solenoid, when energized, shifts it to its forward position. When the solenoid is deenergized, reciprocation of the slide changer member extracts a slide from the front stack, advances it to the projection station, and returns it to the rear stack, and when the solenoid is energized the slide changer member when reciprocated extracts a slide from the rear stack and returns it to the front stack.

BRIEF DESCRIPTION OF THE DRAWINGS

FIG. 1 is a fragmentary side perspective view of a slide change mechanism embodying the present invention;

FIG. 2 is a sectional view taken along line A—A in FIG. 1; and

FIG. 3(a), (b) and (c) are fragmentary top plan views showing the slide changing cycle with the slide changer member shown in its fully advanced position, during retraction and during advance respectively.

DESCRIPTION OF THE PREFERRED EMBODIMENT

Referring now to the drawings which illustrate a preferred embodiment of the present invention, the improved slide changing mechanism comprises a longitudinally extending slide supporting tray suitably supported on the side of the projector medially proximate the side access opening to the projector slide projection station, the tray including pairs of transversely spaced longitudinal extending parallel stationary guide plates 1 having intermediate vertical openings in transverse alignment with the slide projection station. Two pair of longitudinally axially aligned guide pins 2 are located inwardly of and proximate the bottom outer corners of plates 1. A longitudinally extending horizontal bottom plate 3 of lesser length than side plates 1 is disposed between the lower borders of side plates 1 and terminates in depending flanges 2a having openings slidably engaging guide pins 2 so as to be rearwardly and forwardly shiftable a predetermined amount. Disposed in the path of and confronting the inside faces of flanges 2a are suitably mounted stop members 21 provided with longitudinal slots 22 which are suitably, releasably, tightly engaged to permit the longitudinal adjustment of elements 21 to index the proper front and rear positions of plate 3 relative to the projection station. A tension spring 4 extending between a rear fixed pin and a pin depending from plate 3 resiliently urges plate 3 to its right position as shown in FIG. 1 and a solenoid 5 having an armature connected to left flange 2a advances plate 3 to its left position upon energization of solenoid 5.

A transversely inwardly extending horizontal guide lever or arm 6 is freely swingably supported directly above plate 3 by vertical axle 7 mounted on the outer border of plate 3 intermediate its ends and is provided in its rear underface with a longitudinally extending groove 8. A transversely, inwardly directed horizontal arm 11 is disposed below the level of plate 3 and arm 6 and is swingably supported by a fixed vertical pivot pin 10. A tension spring 12 connected between a fixed point and the free end of arm 12 resiliently urges arm 11 in a transverse direction perpendicular to the longitudinal axis of plate 3 and a pin 9 is mounted on arm 11 and projects vertically into sliding engagement with groove 8.

A vertical bracket arm 13 is secured to and projects upwardly from the outer edge of plate 3 intermediate its ends. Mounted on the upper inner face of bracket arm 13 is an inwardly directed guide piece or spacer block 14 which separates the slide stacks carried by the tray into front and rear stacks. The upper end of axle 7 is engaged by spacer member 14. A pair of longitudinally spaced vertical pressure or pusher plates 15 of known construction are disposed on opposite sides of spacer member 14 and suitably longitudinally slidably supported and resiliently urged toward spacer member 14.

The slide changing mechanism includes a vertical transport plate 16 transversely reciprocatably supported by and extending between and slidably engaging a pair of vertically spaced parallel, horizontal, transversely extending upper and lower guide rods 17 and 18 lying in a vertical plane perpendicular to the longitudinal axis of plate 3. Supported by the upper portion of plate 16 and located outwardly thereof by means of a suitable bracket is a slide extractor or withdrawal member 19 of maximum width less than that of spacer block 14 and having an outwardly directed tapered end and a cylindrically concave inwardly directed face. A slide return horizontally, longitudinally projecting arm defining a slide return member is mounted on plate 20 intermediate its top and bottom. The slide changing mechanism, including members 16, 19 and 20, may be of conventional construction and well known motor, clutch transmission and control network means may be provided for reciprocating the slide changing assembly, including plate 16 for each slide changing cycle from left to right, and then returned from right to left, as viewed in FIG. 1. The projector is provided at the projector station in the known manner with a conventionally constructed resilient slide engaging assembly, including projection frame 23, 24.

Considering now the operation of the improved mechanism described above, in the condition illustrated in FIG. 1, the solenoid 5 is unenergized so that the bottom plate 3 is shifted to the right under the influence of spring 4. Thus, the pressure plates 15, the film mounts or slides and the spacer member 14 shift in unison with bottom plate 3 to the right, so that the right or innermost slide of the left stack of slides is located in the path of the slide extractor member 19. In a slide changing cycle, the extractor member 19 is advanced to the outer side of the interstack space delineated by spacer member 14 and the return member engages a side edge of the slide in the projection station and returns it to the right hand slide stack, being restricted thereto by the oblique guide arm 6 whose free end resiliently bears on the inner slide of the left hand stack.

Upon the return stroke of extractor member 19, right to left as viewed in FIG. 1, the inner concave face of the extractor member 19 engages the rear or inner slide of the left hand stack and advances the slide into engagement with frame 23, 24 in the projection station. The slide changing cycle may be periodically repeated.

If it is desired to extract slides from the right hand stack, project them and return them to the left hand stack, in reverse to the manner of operation described above, the solenoid 5 is energized to shift plate 3 and spacer member 14 to the left so that guide arm is caused to bear on the left hand slide of the right hand stack by the action of pin 9. As the plate 16 moves to the right, extractor and return members 19 and 20 move to the right, the return member 20 moving the slide in the projection station to the left hand slide stack as restricted by guide arm 6 bearing on the right hand stack. On the return stroke the concave face of extractor member 19 engages the left hand slide of right hand stack to advance it into the projection station. The width of extractor member 19 being less than that of spacer member 14 and the space between the slide stacks, engages during its return stroke, only a slide from one stack, being spaced from the opposite stack.

As explained above, according to the present invention, the movement of the bottom plate of the film slide holding tray effects the shifting of the guide lever and concurrently positions a film slide to be extracted and advanced to the projection frame in the path of movement of the slide extractor member. Thus, there is provided a slide changing mechanism of simple structure and great durability which is suited for frequent operation cycles and is substantially trouble free even if used for a long time. Another advantage of the present mechanism is that through adjustment of the movement of the bottom plate, it is possible to adjust the relative position of the extractor member to accurately perform the slide extraction action independently of the thickness of the film mount or slide.

While there has been described and illustrated a preferred embodiment of the present invention, it is apparent that numerous alterations, omissions and additions may be made without departing from the spirit thereof.

I claim:

1. In a slide projector, a longitudinally extending slide stack support tray, a spacer member mounted on said tray and longitudinally shiftable between front and rear positions and dividing the slides carried by said tray into front and rear stacks having confronting longitudinally spaced inner slides, said tray including a slide stack supporting bottom section longitudinally shiftable with said spacer member, a transversely reciprocatable slide changer member including a slide extractor element transversely movable between said confronting inner slides along a path alternatively registering with the inner slides of said front and rear stacks when said spacer member is in its rear and forward positions respectively, an inwardly directed slide return guide member alternatively shifted into engagement with said front and rear stack inner slides with said spacer member being in its rear and forward positions respectively, and including a finger pivoted at its outer end to said tray bottom section for swinging about a vertical axis between said stacks, and spring means resiliently biasing the free end of said finger into alternative engagement with said front and rear stack inner slides.

2. The slide projector of claim 1, including spring means resiliently biasing said bottom section to a first position and solenoid actuated means for shifting said bottom section to an opposite second position.

3. The slide projector of claim 1, including a pair of longitudinally movable slide stack pusher members located on opposite sides of said spacer member and resiliently urged toward said spacer member.

* * * * *